United States Patent
Sasaoka et al.

(10) Patent No.: US 9,348,090 B2
(45) Date of Patent: May 24, 2016

(54) OPTICAL COUPLING ELEMENT AND MANUFACTURING METHOD

(71) Applicant: SUMITOMO ELECTRIC INDUSTRIES, LTD., Osaka-shi, Osaka (JP)

(72) Inventors: Eisuke Sasaoka, Yokohama (JP); Takashi Sasaki, Yokohama (JP); Akira Inoue, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 348 days.

(21) Appl. No.: 13/766,921

(22) Filed: Feb. 14, 2013

(65) Prior Publication Data

US 2013/0223795 A1    Aug. 29, 2013

Related U.S. Application Data

(60) Provisional application No. 61/603,456, filed on Feb. 27, 2012.

(51) Int. Cl.
  *G02B 6/26* (2006.01)
  *G02B 6/38* (2006.01)
  *G02B 6/30* (2006.01)
  *G02B 6/255* (2006.01)
  *G02B 6/42* (2006.01)
  (Continued)

(52) U.S. Cl.
  CPC .............. *G02B 6/262* (2013.01); *G02B 6/2552* (2013.01); *G02B 6/30* (2013.01); *G02B 6/3829* (2013.01); *G02B 6/3885* (2013.01); *G02B 6/02042* (2013.01); *G02B 6/421* (2013.01); *G02B 6/4214* (2013.01); *G02B 2006/12107* (2013.01)

(58) Field of Classification Search
  CPC ...... G02B 6/3829; G02B 6/286; G02B 6/305; G02B 6/4403; G02B 6/02042
  See application file for complete search history.

(56) References Cited

U.S. PATENT DOCUMENTS

| 4,208,096 | A | * | 6/1980 | Glenn, Jr. ...................... 385/120 |
| 5,009,475 | A | * | 4/1991 | Knudson ........................ 385/116 |
| 5,136,674 | A | * | 8/1992 | Kakiuchi et al. .............. 385/115 |

(Continued)

FOREIGN PATENT DOCUMENTS

| JP | 53107346 A | * | 9/1978 |
| JP | S56-097304 | | 8/1981 |

(Continued)

OTHER PUBLICATIONS

Kondo et al., Machine Translation of JP 2003-344734 A, Dec. 2003.*

(Continued)

*Primary Examiner* — Michelle R Connelly
(74) *Attorney, Agent, or Firm* — Drinker Biddle & Reath LLP

(57) ABSTRACT

The present invention relates to an optical coupling element to optically couple optical elements of different kinds to each other, which is provided with a plurality of cores. In the optical coupling element a first end and a second end opposed thereto are different in at least either of a core array and a core interval. The optical coupling element has a bent shape of at least a part of the optical coupling element itself including the cores, so that a light input/output direction at the first end is different from a light input/output direction at the second end.

12 Claims, 5 Drawing Sheets

(51) Int. Cl.
  *G02B 6/02* (2006.01)
  *G02B 6/12* (2006.01)

(56) References Cited

U.S. PATENT DOCUMENTS

| | | | | |
|---|---|---|---|---|
| 7,359,594 | B2* | 4/2008 | Nishizawa et al. | 385/32 |
| 7,460,755 | B2* | 12/2008 | Bruesselbach et al. | 385/116 |
| 7,697,808 | B2* | 4/2010 | D'Urso et al. | 385/115 |
| 8,270,784 | B2* | 9/2012 | Thomson et al. | 385/15 |
| 8,320,724 | B2* | 11/2012 | Sasaoka | 385/121 |
| 8,478,098 | B2* | 7/2013 | Hayashi et al. | 385/126 |
| 2002/0012504 | A1* | 1/2002 | Gillham et al. | 385/86 |
| 2004/0197045 | A1* | 10/2004 | Lappohn | 385/14 |
| 2005/0018989 | A1* | 1/2005 | Shimizu et al. | 385/129 |
| 2005/0058399 | A1* | 3/2005 | Nishizawa et al. | 385/39 |
| 2007/0086712 | A1* | 4/2007 | Shani | 385/101 |
| 2007/0237449 | A1* | 10/2007 | Aoki et al. | 385/14 |
| 2009/0052836 | A1* | 2/2009 | Hodge | 385/14 |
| 2009/0097364 | A1* | 4/2009 | Tawa et al. | 369/13.17 |
| 2010/0008624 | A1* | 1/2010 | Singer et al. | 385/24 |
| 2010/0195965 | A1* | 8/2010 | Sasaoka | 385/126 |
| 2010/0247042 | A1* | 9/2010 | Suzuki et al. | 385/88 |
| 2011/0123149 | A1* | 5/2011 | Hemenway, Jr. et al. | 385/32 |
| 2011/0129231 | A1* | 6/2011 | Fiorentino et al. | 398/141 |
| 2011/0222828 | A1* | 9/2011 | Sasaoka et al. | 385/127 |
| 2011/0280517 | A1* | 11/2011 | Fini et al. | 385/43 |
| 2014/0294345 | A1* | 10/2014 | Kopp et al. | 385/24 |

FOREIGN PATENT DOCUMENTS

| | | | |
|---|---|---|---|
| JP | S63-017433 | | 1/1988 |
| JP | H2-058006 | | 2/1990 |
| JP | 2003344734 | A * | 12/2003 |
| JP | 2004-295010 | | 10/2004 |
| JP | 2010-122292 | | 6/2010 |
| JP | 2010-286661 | | 12/2010 |
| JP | 2011018013 | A | 1/2011 |

OTHER PUBLICATIONS

English-language translation of International Preliminary Report on Patentability (IPRP) dated Sep. 12, 2014 that issued in WO Patent Application No. PCT/JP2013/051870.

Attila Mekis et al., "A Grating-Coupler-Enabled CMOS Photonics Platform", IEEE Journal of Selected Topics in Quantum Electronics, May/Jun. 2011, pp. 597-608, vol. 17, No. 3.

* cited by examiner

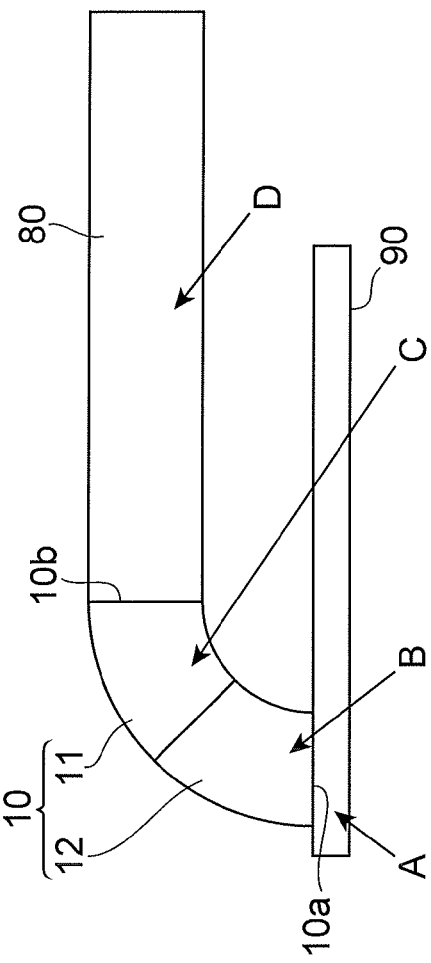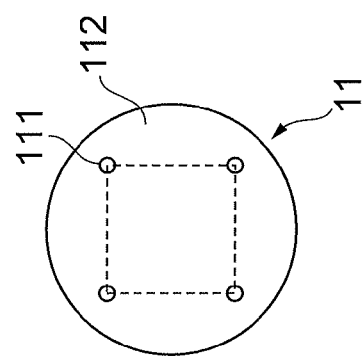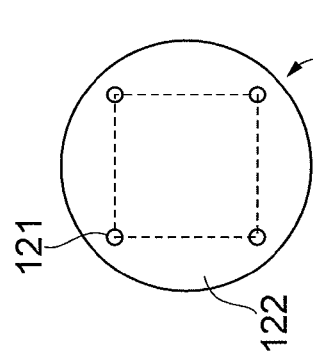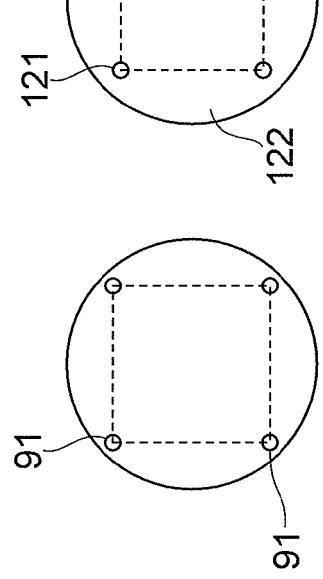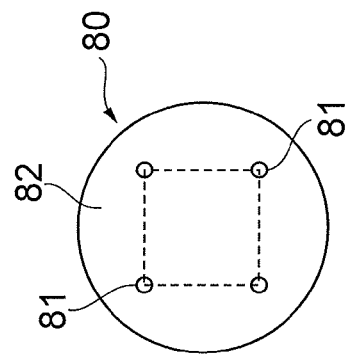

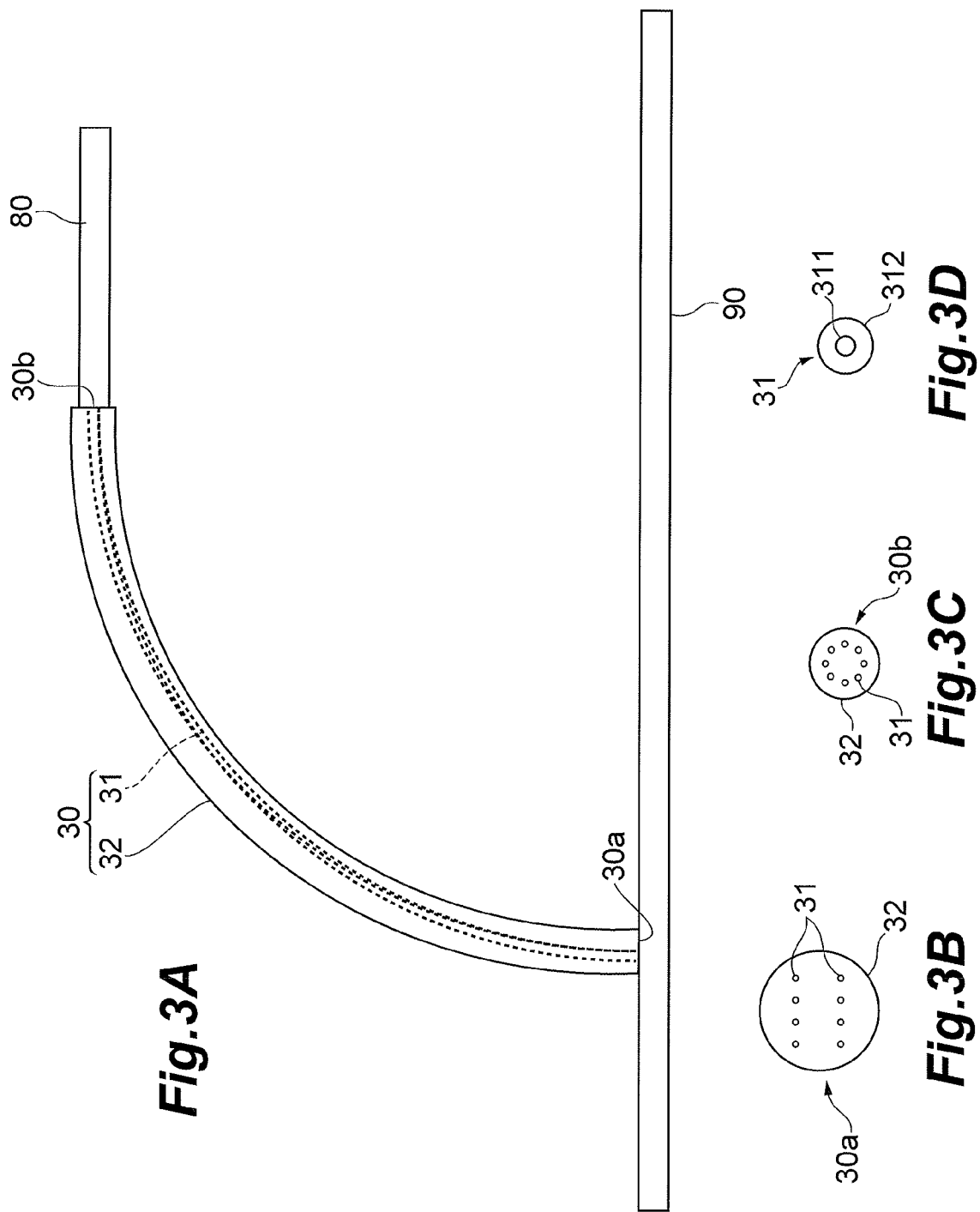

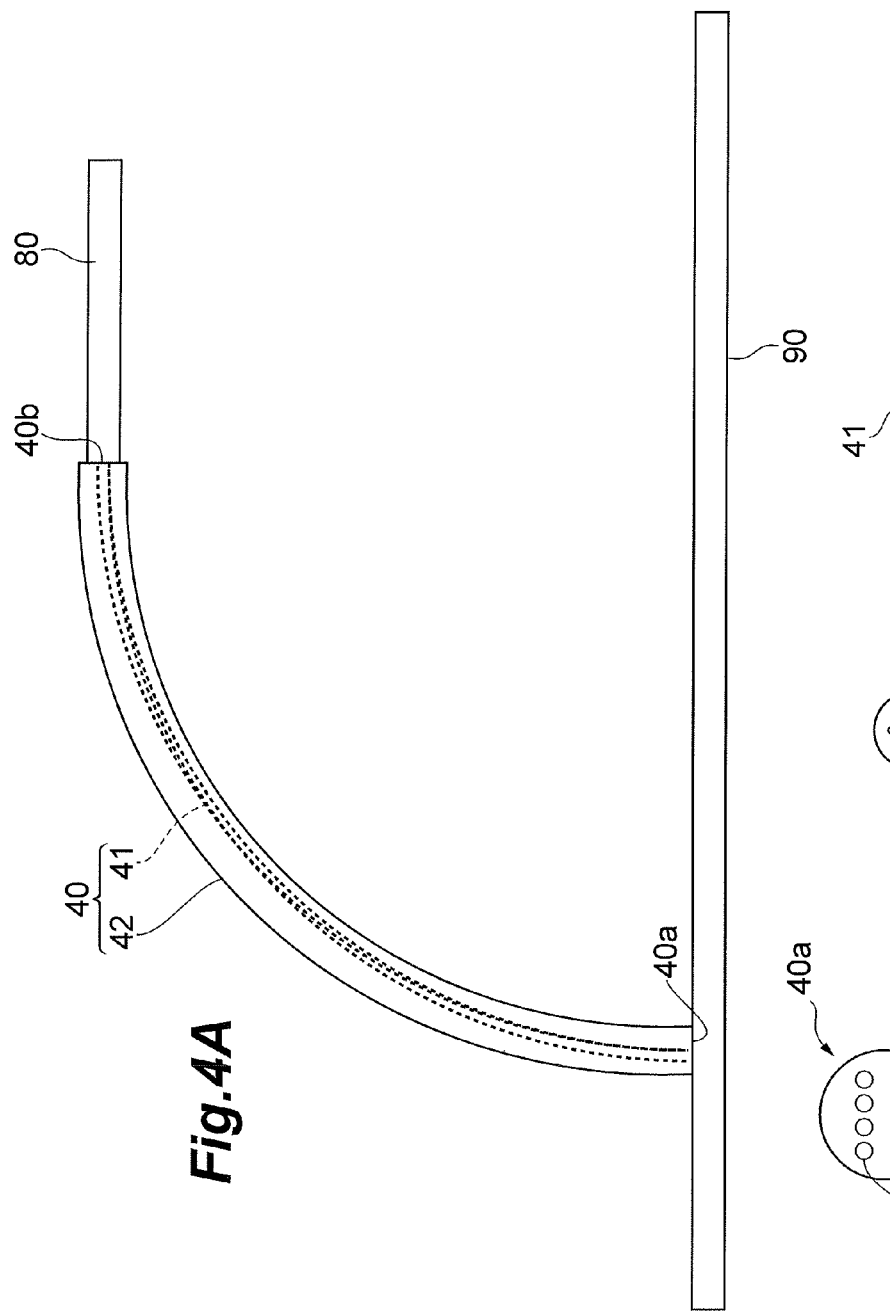

OPTICAL COUPLING ELEMENT AND MANUFACTURING METHOD

This application claims the benefit of U.S. Provisional Application No. 61/603,456 filed Feb. 27, 2012, which is incorporated by reference herein in the entirety.

BACKGROUND OF THE INVENTION

1. Field of the Invention

The present invention relates to an optical coupling element and a manufacturing method thereof.

2. Related Background of the Invention

A core array converter of the invention described in Japanese Patent Application Laid-Open No. 2011-18013 (Patent Document 1) is disposed between a multi-core optical fiber with a plurality of cores in a common cladding and an optical element with a plurality of light input/output points, and is configured to optically couple the cores of the multi-core optical fiber to the light input/output points of the optical element.

Attila Mekis, et al., "A Grating-Coupler-Enabled CMOS Photonics Platform," IEEE JOURNAL OF SELECTED TOPICS IN QUANTUM ELECTRONICS, Vol. 17, No. 3, pp. 597-608 (2011) (Non-patent Document 1) describes a method using grating couplers as means to optically couple a planar optical waveguide manufactured by the CMOS process, to an optical fiber, so as to achieve optical coupling to the optical fiber having the optical axis in a direction approximately perpendicular to a plane of the planar optical waveguide.

SUMMARY OF THE INVENTION

2.The inventors investigated the conventional optical coupling technologies and found the problem as described below. Specifically, when the planar optical waveguide and the multi-core optical fiber are optically coupled to each other by the method described in Non-patent Document 1 above, and when the direction of extraction of the multi-core optical fiber is parallel to the plane of the planar optical waveguide, an extraction portion needs to be bent by about 90° relative to the part near the end of the multi-core optical fiber. If there is no enough space in the direction perpendicular to the plane of the planar optical waveguide, the bend of 90° of the multi-core optical fiber needs to be achieved in a small diameter. In this case, there are possibilities of causing an increase in bending loss of the multi-core optical fiber, an increase in core-to-core crosstalk due to the bend in the small diameter, an increase in probability of rupture of fiber due to bending strain, and so on.

The present invention has been accomplished in order to solve the above problem and it is an object of the present invention to provide an optical coupling element and a manufacturing method thereof capable of suppressing degradation of characteristics of a multi-core optical fiber in optically coupling the multi-core optical fiber and an optical element to each other.

An optical coupling element according to the present invention, as a first aspect, comprises a plurality of cores each of which allows light to propagate therein, a first end in which one end faces of the cores are arranged, a second end opposed to the first end, in which the other end faces of the cores are arranged, and a bent shape of at least a part of the optical coupling element between the first end and the second end. In this first aspect, the first end and the second end are different from each other, in at least either of a core array and a core interval. Therefore, cases where a planar structure of the first end is different from a planar structure of the second end include a case where they are different only in the core array, a case where they are different only in the core interval, and a case where they are different in both of the core array and the core interval. The bent shape of the optical coupling element is obtained by bending a holding material (e.g., a cladding material, a tube, or the like) integrally holding these cores, together with the cores. When the holding material itself is bent in this manner, the core interval and/or the bent state is maintained for the cores in the optical coupling element. As a result, a fixed shape is realized so that a light input/output direction at the first end is different from a light input/output direction at the second end. The core interval is defined by a minimum distance between centers of the adjacent cores.

As a second aspect applicable to the first aspect, a structure in which the core array in the first end is similar to the core array in the second end and in which the core interval in the first end is different from the core interval in the second end is applicable to the optical coupling element.

As a third aspect applicable to the first or second aspect, the interval of the cores in the optical coupling element may change stepwise from the first end to the second end. As a fourth aspect applicable to the first or second aspect, the interval of the cores in the optical coupling element may change continuously from the first end to the second end. Furthermore, as a fifth aspect applicable to at least any one of the first to fourth aspects, the core array in at least one of the first end and the second end may be a one-dimensional pattern. As a sixth aspect applicable to at least any one of the first to fourth aspects, the core array in at least one of the first end and the second end may be a two-dimensional pattern.

As a seventh aspect applicable to at least any one of the first to sixth aspects, each of the cores in the optical coupling element may be a single core of a small-diameter optical fiber. Namely, the optical coupling element according to the seventh aspect may include a plurality of small-diameter optical fibers (each of which has a single core) and be configured so that these small-diameter optical fibers are integrally handled by a holding material such as a cladding material or a tube. The small-diameter optical fibers refer to optical fibers smaller than the standard fiber diameter (outside diameter of cladding) of 125 μm.

Furthermore, as an eighth aspect applicable to at least any one of the first to seventh aspects, the first end and the second end may be different from each other in at least either of a diameter and a refractive index of the cores in the optical coupling element. As a ninth aspect for realizing this eighth aspect, at least either of the diameter and the refractive index of the cores in the optical coupling element can be changed by thermal diffusion of a dopant in the cores, in at least one of the first end and the second end. As a tenth aspect applicable to the ninth aspect, optical fibers with the standard fiber diameter may be applied to the optical coupling element, instead of the small-diameter optical fibers. In this case, the optical coupling element according to the tenth aspect comprises a plurality of optical fibers each of which has a single core. In this tenth aspect, the refractive index of the single core is preferably changed by relaxation of residual stress in the single core, at one end of each of the optical fibers.

An eleventh aspect of the present invention relates to an optical coupling element manufacturing method for manufacturing the optical coupling element according to at least any one of the first to tenth aspects. The optical coupling element manufacturing method according to the eleventh aspect comprises softening a starting material with a plurality of cores in a common cladding, and extending the softened starting material, thereby obtaining the optical coupling element according to at least any one of the first to tenth aspects.

An optical coupling element according to a twelfth aspect comprises a plurality of cores each of which allows light to propagate therein, a first end in which one end faces of the cores are arranged, and a second end opposed to the first end, in which the other end faces of the cores are arranged, and a core interval in the first end is different from a core interval in the second end. Particularly, in this twelfth aspect, the interval of the cores in the optical coupling element changes stepwise from the first end to the second end.

An optical coupling element according to a thirteenth aspect, like the twelfth aspect, comprises a plurality of cores each of which allows light to propagate therein, a first end in which one end faces of the cores are arranged, and a second end opposed to the first end, in which the other end faces of the cores are arranged, and the first end and the second end are different from each other in at least either of a core array and a core interval. Particularly, the optical coupling element according to the thirteenth aspect is comprised of a plurality of optical fibers each of which has a single core corresponding to any one of the cores in the optical coupling element. In this configuration, a refractive index of the single core is changed by relaxation of residual stress in the single core, at one end of each of the optical fibers.

BRIEF DESCRIPTION OF THE DRAWINGS

FIGS. 1A to 1E are drawings showing a configuration of an optical coupling element according to the first embodiment;

FIGS. 2A to 2F are drawings showing a configuration and a manufacturing method of an optical coupling element according to the second embodiment (an optical coupling element manufacturing method according to an embodiment of the present invention);

FIGS. 3A to 3D are drawings showing a configuration of an optical coupling element according to the third embodiment;

FIGS. 4A to 4D are drawings showing a configuration of an optical coupling element according to the fourth embodiment.

DESCRIPTION OF THE PREFERRED EMBODIMENTS

Figure 2A:
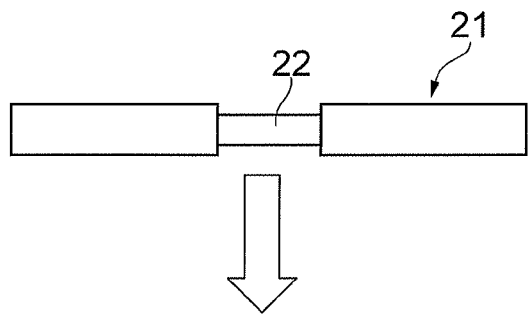

Embodiments of the present invention will be described below in detail with reference to the accompanying drawings. The same elements will be denoted by the same reference signs in the description of the drawings, without redundant description.

(First Embodiment)

FIGS. 1A to 1E are drawings showing a configuration of an optical coupling element 10 according to the first embodiment. FIG. 1A shows an optical coupling state between a multi-core optical fiber 80 and a planar optical waveguide (optical element) 90 through the optical coupling element 10 according to the first embodiment. FIG. 1B to FIG. 1E are drawings showing core arrays and others in portions indicated by arrows A to D in FIG. 1A.

As shown in FIG. 1A, the optical coupling element 10 is an optical component to optically couple the multi-core optical fiber 80 and the planar optical waveguide 90 to each other, which is provided with an optical coupling element 11 on the multi-core optical fiber side and an optical coupling element 12 on the planar optical waveguide side and which has a first end 10a facing the planar optical waveguide 90 and a second end 10b facing the multi-core optical fiber 80. In the example shown in FIG. 1A, the planar optical waveguide 90, the optical coupling element 12 on the planar optical waveguide side, the optical coupling element 11 on the multi-core optical fiber side, and the multi-core optical fiber 80 are optically connected in the order named.

In FIG. 1B, circles represent light input/output positions of the planar optical waveguide 90 (i.e., positions where grating couplers 91 are provided). The four grating couplers 91 of the planar optical waveguide 90 are disposed at respective apexes of a square with the length of 50 μm on each side. In FIG. 1C, circles represent positions of cores 121 in a cross section of the optical coupling element 12 on the planar optical waveguide side, i.e., positions of cores 121 integrally held by a cladding material 122. The four cores 121 of the optical coupling element 12 on the planar optical waveguide side are disposed at respective apexes of a square with the length of 48 μm on each side. The core array in at least one of the first end 10a and the second end 10b may be a one-dimensional pattern.

In FIG. 1D, circles represent positions of cores 111 in a cross section of the optical coupling element 11 on the multi-core optical fiber side, i.e., positions of cores 111 integrally held by a cladding material 112. The four cores 111 of the optical coupling element 11 on the multi-core optical fiber side are disposed at respective apexes of a square with the length of 46 μm on each side. In FIG. 1E, circles represent positions of cores 81 in a cross section of the multi-core optical fiber 80, i.e., positions of cores 81 integrally held by a cladding 82. The four cores 81 of the multi-core optical fiber 80 are disposed at respective apexes of a square with the length of 44 μm on each side.

The grating couplers 91 of the planar optical waveguide 90 and the cores 121 of the optical coupling element 12 on the planar optical waveguide side are arranged in one-to-one correspondence. The cores 121 of the optical coupling element 12 on the planar optical waveguide side and the cores 111 of the optical coupling element 11 on the multi-core optical fiber side are arranged in one-to-one correspondence. The cores 111 of the optical coupling element 11 on the multi-core optical fiber side and the cores 81 of the multi-core optical fiber 80 are arranged in one-to-one correspondence.

Therefore, when light is output from any one of the grating couplers 91 of the planar optical waveguide 90, the light propagates through the corresponding core 121 of the optical coupling element 12 on the planar optical waveguide side and the corresponding core 111 of the optical coupling element 11 on the multi-core optical fiber side to enter the corresponding core 81 of the multi-core optical fiber 80. Conversely, when light is output from any one of the cores 81 of the multi-core optical fiber 80, the light propagates through the corresponding core 111 of the optical coupling element 11 on the multi-core optical fiber side and the corresponding core 121 of the optical coupling element 12 on the planar optical waveguide side to enter the corresponding grating coupler 91 of the planar optical waveguide 90.

Each of the optical coupling element 11 on the multi-core optical fiber side and the optical coupling element 12 on the planar optical waveguide side is fixed in a bent state. For this reason, the planar optical waveguide 90 receives or emits light in a direction approximately perpendicular to a plane of the planar optical waveguide 90, whereas the multi-core optical fiber 80 receives or emits light in a direction parallel to the plane of the planar optical waveguide 90. Namely, the optical coupling element 10 has a shape such that the light input/output direction in the first end 10a is different from the light input/output direction in the second end 10b.

Since the interval (50 μm) of the grating couplers 91 in the planar optical waveguide 90 is significantly different from the interval (44 μm) of the cores 81 in the multi-core optical fiber 80, if the planar optical waveguide 90 is connected directly to the multi-core optical fiber 80, there will occur a significant splice loss at the coupling part. In the present embodiment, however, the planar optical waveguide 90 and the multi-core optical fiber 80 are optically connected through the optical coupling element 10 and the core interval changes stepwise from the first end 10a to the second end 10b, which reduces the loss at each coupling part. The diameters of the respective cores in the optical coupling element may be suitably set to preferred diameters in terms of the coupling loss and in the present embodiment the cores 121 and the cores 111 all have the diameter of 10 μm. Since the optical coupling element 10 has the fixed shape in the bent state, the multi-core optical fiber 80 can be installed in the direction parallel to the plane of the planar optical waveguide 90, without application of small-diameter bend to the multi-core optical fiber 80.

In each of the cladding material 112 of the optical coupling element 11 on the multi-core optical fiber side and the cladding material 122 of the optical coupling element 12 on the planar optical waveguide side, it also becomes feasible to reduce the bending loss and core-to-core crosstalk degradation due to bending, by means such as provision of a trench part or a hole part around the cores 111 and around the cores 121. It should be noted that the respective outside diameters of the cladding material 112 of the optical coupling element 11 on the multi-core optical fiber side and the cladding material 122 of the optical coupling element 12 on the planar optical waveguide side do not always have to agree with the cladding diameter of the multi-core optical fiber 80. When the respective outside diameters of the cladding material 112 of the optical coupling element 11 on the multi-core optical fiber side and the cladding material 122 of the optical coupling element 12 on the planar optical waveguide side are set smaller than the cladding diameter of the multi-core optical fiber 80, it also becomes feasible to reduce strain on the cladding surface due to bending, in each of the optical coupling element 11 on the multi-core optical fiber side and the optical coupling element 12 on the planar optical waveguide side, and thereby to reduce a possibility of rupture of optical fiber due to strain with application of bend.

(Second Embodiment)

Figure 2B:
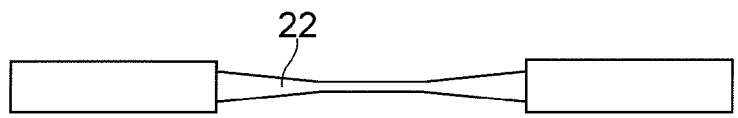
Figure 2C:
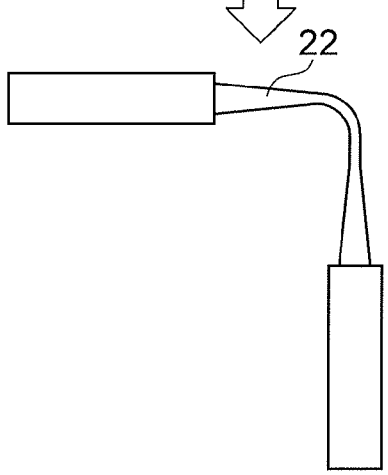
Figure 2D:
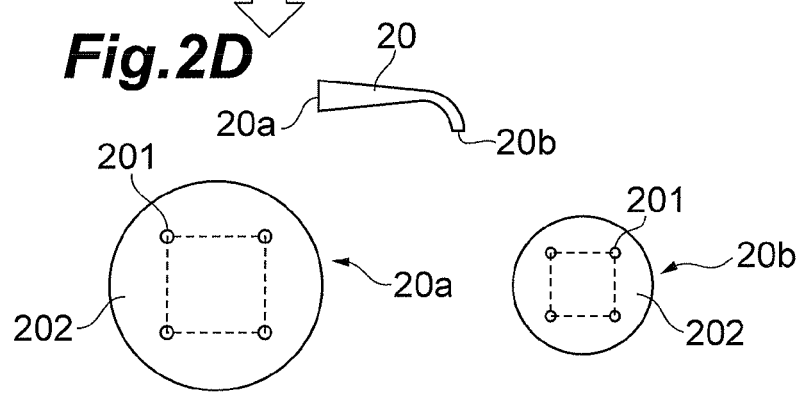

FIGS. 2A to 2F are drawings showing a configuration and a manufacturing method of an optical coupling element 20 according to the second embodiment (an optical coupling element manufacturing method according to an embodiment of the present invention). FIGS. 2A to 2C are drawings for explaining respective steps for manufacturing the optical coupling element 20 shown in FIG. 2D, FIG. 2E shows a first end 20a of the optical coupling element 20 shown in FIG. 2D, and FIG. 2F shows a second end 20b of the optical coupling element 20 shown in FIG. 2D.

In the optical coupling element 20 according to the second embodiment, as shown in FIGS. 2D to 2F, a plurality of cores 201 are also integrally held by a cladding material 202 and a part of the optical coupling element has a bent shape. As can be seen from FIGS. 2E and 2F, the first end 20a and the second end 20b are different in core interval. In the present embodiment, a two-dimensional core array in the first end 20a is similar to a two-dimensional core array in the second end 20b (though the core arrays may be one-dimensional patterns).

The optical coupling element 20 having the structure as described above is manufactured as described below. Specifically, as shown in FIG. 2A, a coating layer is removed from a longitudinally partial region of a multi-core optical fiber 21 with four cores 201 to expose glass 22. As shown in FIG. 2B, the exposed glass 22 is heated to soften by a heat source such as a micro burner or an electric heater and then it is extended into a taper shape. As shown in FIG. 2C, while the taper part of the glass 22 is kept in the softened state by heat, a small-diameter portion of the taper part of the glass 22 is bent by about 90°.

Then, as shown in FIG. 2D, the bent taper part is cut out, it is then coated with resin or the like by molding, and the end faces thereof are polished. The optical coupling element 20 can be manufactured through the steps as described above. The optical coupling element 20 manufactured as described above has the bend of about 90°, the core interval in the second end 20b agrees with the core interval of the multi-core optical fiber 80, and the core interval in the first end 20a agrees with the grating coupler interval of the planar optical waveguide 90.

Since this optical coupling element 20 is manufactured by the extension into the taper shape, the core interval changes continuously from the first end 20a to the second end 20b. For this reason, it becomes feasible to couple the multi-core optical fiber 80 and the planar optical waveguide 90 different in core interval, with low loss. Furthermore, since this optical coupling element 20 is manufactured by bending the taper part in the softened state and thereafter hardening it in the bent state, it also becomes feasible to substantially null the surface strain due to bending.

In the multi-core optical fiber 21, it also becomes feasible to reduce the bending loss and the core-to-core crosstalk degradation due to bending, by means such as provision of a trench part or a hole part around each core. Since the bent part in the multi-core optical fiber 21 has the small outside diameter because of the extension into the taper shape, even if there occurs bending strain, the strain on the surface will be relatively smaller than in unextended portions. As a result, the present embodiment is also effective to reduction in probability of rupture of optical fiber due to bending.

(Third Embodiment)

FIGS. 3A to 3D are drawings showing a configuration of an optical coupling element 30 according to the third embodiment. The optical coupling element 30 is an optical component to optically couple the multi-core optical fiber 80 and the planar optical waveguide 90 to each other, which has a first end 30a facing the planar optical waveguide 90 and a second end 30b facing the multi-core optical fiber 80, and which is provided with eight small-diameter optical fibers 31 (each of which includes a single core) extending between the first end 30a and the second end 30b, and a tube 32 housing these small-diameter optical fibers 31. FIG. 3A is a drawing showing an optical coupling state between the multi-core optical fiber 80 and the planar optical waveguide 90 through the optical coupling element 30, FIG. 3B shows a core array in the first end 30a (an array of the cores of the small-diameter optical fibers 31), and FIG. 3C shows a core array in the second end 30b (an array of the cores of the small-diameter optical fibers 31). Each small-diameter optical fiber 31, as shown in FIG. 3D, is composed of a core 311 and a cladding 312 covering the outer peripheral surface of the core 311.

In the first end 30a of the optical coupling element 30 optically coupled to the grating couplers of the planar optical waveguide 90 (cf. FIG. 1B), the eight cores in the optical coupling element 30 (i.e., the eight small-diameter optical fibers 31) are fixed in a two-dimensional array state of two rows and four columns so as to match the arrangement of eight grating couplers in the planar optical waveguide 90. The core array in at least one of the first end 30a and the second end 30b may be a one-dimensional pattern. On the other hand, in the second end 30b of the optical coupling element 30 optically coupled to the cores of the multi-core optical fiber 80 (cf. FIG. 1E), the eight cores in the optical coupling element 30 (i.e., the eight small-diameter optical fibers 31) are fixed in a state in which they are arranged at equal intervals on the same circumference so as to match the arrangement of the eight cores in the multi-core optical fiber 80. In the optical coupling element 30, the eight small-diameter optical fibers 31 are housed in the tube 32. In both of the first end 30a and the second end 30b of the optical coupling element 30, the eight small-diameter optical fibers 31 are fixed in the tube 32 while being maintained in the two-dimensional core arrays as described above.

In the optical coupling element 30 according to the third embodiment, the two-dimensional core array in the first end 30a agrees with the grating coupler array of the planar optical waveguide 90 and the two-dimensional core array in the second end 30b agrees with the core array of the multi-core optical fiber 80. For this reason, the planar optical waveguide 90 and the multi-core optical fiber 80 can be coupled with low loss. Furthermore, even in the bent state of the optical coupling element 30, as shown in FIG. 3A, the portions to be bent are the small-diameter optical fibers 31 and, for this reason, the strain generated on the surfaces of the small-diameter optical fibers 31 becomes relatively smaller than in the case of ordinary-diameter optical fibers. Therefore, the adoption of the small-diameter optical fibers 31 is also effective to reduction in probability of rupture of the small-diameter optical fibers 31 due to bending. In each of the small-diameter optical fibers 31, it is also feasible to reduce the bending loss of the small-diameter optical fiber 31, by means such as provision of a trench part or a hole part around the core 311.

(Fourth Embodiment)

FIGS. 4A to 4D are drawings showing a configuration of an optical coupling element 40 according to the fourth embodiment. The optical coupling element 40 is an optical component to optically couple the multi-core optical fiber 80 and the planar optical waveguide 90 to each other, which has a first end 40a facing the planar optical waveguide 90 and a second end 40b facing the multi-core optical fiber 80, and which is provided with eight small-diameter optical fibers 41 (each of which includes a single core) extending between the first end 40a and the second end 40b, and a tube 42 housing these small-diameter optical fibers 41. FIG. 4A is a drawing showing an optical coupling state between the multi-core optical fiber 80 and the planar optical waveguide 90 through the optical coupling element 40, FIG. 4B shows a core array in the first end 40a (an array of the cores of the small-diameter optical fibers 41), and FIG. 4C shows a core array in the second end 40b (an array of the cores of the small-diameter optical fibers 41). Each small-diameter optical fiber 41, as shown in FIG. 4D, is composed of a core 411 and a cladding 412 covering the outer peripheral surface of the core 411.

In the first end 40a of the optical coupling element 40 optically coupled to the grating couplers of the planar optical waveguide 90 (cf. FIG. 1B), the eight cores in the optical coupling element 40 (i.e., the eight small-diameter optical fibers 41) are fixed in a two-dimensional array state of two rows and four columns so as to match the arrangement of the eight grating couplers in the planar optical waveguide 90. The core array in at least one of the first end 40a and the second end 40b may be a one-dimensional pattern. On the other hand, in the second end 40b of the optical coupling element 40 optically coupled to the cores of the multi-core optical fiber 80 (cf. FIG. 1E), the eight cores in the optical coupling element 40 (i.e., the eight small-diameter optical fibers 41) are fixed in a state in which they are arranged at equal intervals on the same circumference so as to match the arrangement of the eight cores in the multi-core optical fiber 80. In the optical coupling element 40 the eight small-diameter optical fibers 41 are housed in the tube 42. In both of the first end 40a and the second end 40b in the optical coupling element 40, the eight small-diameter optical fibers 41 are fixed in the tube 42 while being maintained in the two-dimensional core arrays as described above.

This fourth embodiment is different in the structure of each core in the first end 40a and/or the second end 40b from the aforementioned third embodiment. Namely, in the first end 40a of the optical coupling element 40 optically coupled to the grating couplers of the planar optical waveguide 90, each of the eight small-diameter optical fibers 41 is heated for a given length of time by a heat source such as a micro burner or an electric heater. In this case, a dopant in each core 411 is thermally diffused to expand the core diameter, so as to reduce a peak refractive index of each core 411. As another example, each of the eight small-diameter optical fibers 41 may be an optical fiber drawn under a condition that tensile stress remains in the core 411. In this case, in the second end 40b of the optical coupling element 40 optically coupled to the multi-core optical fiber 80, each fiber is also heated for a given length of time by a heat source such as a micro burner or an electric heater to reduce residual stress in each core (core 411 of small-diameter optical fiber 41) (by relaxation of residual stress at the fiber end). This increases the peak refractive index of each core.

In the optical coupling element 40 according to the fourth embodiment, the two-dimensional core array in the first end 40a agrees with the grating coupler array of the planar optical waveguide 90 and the two-dimensional core array in the second end 40b agrees with the core array of the multi-core optical fiber 80. For this reason, the planar optical waveguide 90 and the multi-core optical fiber 80 can be coupled with low loss. Even if the spot diameters and divergence angles of light are different between the grating couplers of the planar optical waveguide 90 and the cores of the multi-core optical fibers 80, it also becomes feasible to match the spot diameters and divergence angles at the corresponding ends of the optical coupling element. Furthermore, even in the bent state of the optical coupling element 40, as shown in FIG. 4A, the portions to be bent are the small-diameter optical fibers 41 and, for this reason, the strain generated on the surfaces of the small-diameter optical fibers becomes relatively smaller than in the case of the ordinary-diameter optical fibers. Therefore, the adoption of the small-diameter optical fibers 41 is effective to reduction in probability of rupture of the small-diameter optical fibers 41 due to bending. In each small-diameter optical fiber 41, it also becomes feasible to reduce the bending loss of the small-diameter optical fiber 41, by means such as provision of a trench part or a hole part around the core 411.

(Modification Examples)

In each of the first to fourth embodiments described above, the optical coupling element was bent by about 90°, but it is also conceivable to use the optical coupling element so as to couple light in any direction other than the substantially perpendicular direction to the plane of the planar optical waveguide, by means such as grating couplers. A conceivable example is such that light is coupled at an end of the planar optical waveguide, and in this case, it is also conceivable to use the optical coupling element without provision of bend. In this case, it is contemplated to adopt a configuration where a dopant in the cores is thermally diffused to change the core diameter or the refractive index, at one end or at the other end of the optical coupling element. This configuration allows adjustment of the mode field diameter at the input end and the output end of the optical coupling element.

Figure 5:
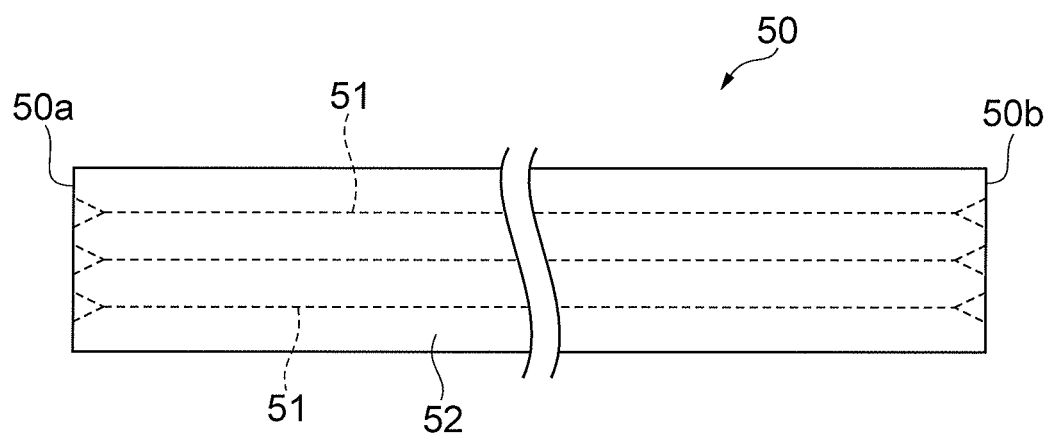
FIG. 5 is a drawing showing a configuration of an optical coupling element according to a modification example.

FIG. 5 is a drawing showing a configuration of an optical coupling element 50 according to a modification example. In this FIG. 5, the optical coupling element 50 has a first end 50a, a second end 50b opposed to the first end 50a, a plurality of cores 51 extending between these first end 50a and second end 50b and each allowing light to propagate therein, and a cladding material 52 integrally holding the cores 51. In each of the first end 50a and the second end 50b of the optical coupling element 50, the diameter of each core 51 is expanded by thermal diffusion of the dopant added in each core 51.

The foregoing first to fourth embodiments were described on the premise that the cores operate in a single mode, but it should be noted that the present invention is also applicable to cores to operate in multiple modes as in the above modification example.

With the optical coupling elements according to the embodiments of the present invention, degradation of characteristics of a multi-core optical fiber is effectively suppressed in optically coupling the multi-core optical fiber and an optical element to each other.

What is claimed is:

1. An optical coupling element constituted by a multi-core optical fiber having a plurality of cores each of which allows light to propagate therein and is integrally surrounded by a common cladding, the optical coupling element comprising:
    a first end in which one end faces of the cores are arranged;
    a second end opposed to the first end, in which the other end faces of the cores are arranged, the second end being different from the first end in a core interval of the cores integrally surrounded by the common cladding; and
    a fixed bent shape of at least a part of the optical coupling element itself comprising the cores integrally surrounded by the common cladding being hardened in the fixed bent shape, so that a light input/output direction at the first end is different from a light input/output direction at the second end,
    wherein the fixed bent shape is undeformable.

2. The optical coupling element according to claim 1, wherein a core array in the first end is similar to a core array in the second end, and wherein the core interval in the first end is different from the core interval in the second end.

3. The optical coupling element according to claim 1, wherein the interval of the cores changes stepwise from the first end to the second end.

4. The optical coupling element according to claim 1, wherein the interval of the cores changes continuously from the first end to the second end.

5. The optical coupling element according to claim 1, wherein each core array in the first end and the second end is comprised of a one-dimensional pattern.

6. The optical coupling element according to claim 1, wherein each core array in the first end and the second end is comprised of a two-dimensional pattern.

7. The optical coupling element according to claim 1, wherein the first end and the second end are different from each other with respect to one of a diameter and a refractive index of the cores.

8. An optical coupling element manufacturing method for manufacturing the optical coupling element defined in claim 1, comprising softening a starting material with a plurality of cores in a common cladding, and extending the softened starting material.

9. An optical component comprising:
    a multi-core optical fiber having a plurality of cores each surrounded by a common cladding, and one end in which end faces of the cores are arranged;
    the optical coupling element according to claim 1; and
    a planar optical waveguide having a main surface in which a plurality of light input/output portions are arranged,
    wherein the multi-core optical fiber is optically connected with the optical coupling element while the cores in the one end of the multi-core optical fiber are respectively coincident with the cores in the first end of the optical coupling element, and the planar optical waveguide is optically connected with the optical coupling element while the light input/output portions in the main surface of the planar optical waveguide are respectively coincident with the cores in the second end of the optical coupling element.

10. An optical coupling element comprising a plurality of cores each of which allows light to propagate therein, and comprising:
    a first end in which one end faces of the cores are arranged;
    a second end opposed to the first end, in which the other end faces of the cores are arranged, the second end differing in at least either of a core array and a core interval from the first end; and
    a bent shape of at least a part of the optical coupling element itself comprising the cores, so that a light input/output direction at the first end is different from a light input/output direction at the second end,
    wherein the first end and the second end are different from each other with respect to at least either of a diameter and a refractive index of the cores,
    wherein in at least one of the first end and the second end, at least either of the diameter and the refractive index of the cores is changed by thermal diffusion of a dopant in the cores.

11. The optical coupling element according to claim 10, which is comprised of a plurality of optical fibers each of which has a single core corresponding to any one of the cores,
    wherein at one ends of the respective optical fibers, the refractive index of the single cores is changed by relaxation of residual stress in the single cores.

12. An optical coupling element constituted by a multi-core optical fiber having a plurality of cores each of which allows light to propagate therein and is integrally surrounded by a common cladding, the optical coupling element comprising:
    a first end in which one end faces of the cores are arranged;
    a second end opposed to the first end, in which the other end faces of the cores are arranged, the second end being different from the first end in a core interval of the cores integrally surrounded by the common cladding, and
    a fixed bent shape of at least a part of the optical coupling element itself comprising the cores integrally surrounded by the common cladding being hardened in the fixed bent shape, so that a light input/output direction at the first end is different from a light input/output direction at the second end,
    wherein the core interval of the cores integrally surrounded by the common cladding changes stepwise from the first end to the second end, and
    wherein the fixed bent shape is undeformable.

* * * * *